United States Patent
Hanussek et al.

(10) Patent No.: US 10,610,938 B2
(45) Date of Patent: Apr. 7, 2020

(54) HANDHELD WORK APPARATUS

(71) Applicant: Andreas Stihl AG & Co. KG, Waiblingen (DE)

(72) Inventors: Sebastian Hanussek, Remseck (DE); Jan Rieger, Oppenweiler (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 15/357,719

(22) Filed: Nov. 21, 2016

(65) Prior Publication Data

US 2017/0066068 A1 Mar. 9, 2017

Related U.S. Application Data

(63) Continuation of application No. PCT/EP2015/001008, filed on May 15, 2015.

(30) Foreign Application Priority Data

May 24, 2014 (DE) .......................... 10 2014 007 878

(51) Int. Cl.
B23D 47/12 (2006.01)
B27B 5/38 (2006.01)
(Continued)

(52) U.S. Cl.
CPC ............ B23D 47/12 (2013.01); B23D 45/16 (2013.01); B27B 5/38 (2013.01); B27B 9/00 (2013.01);
(Continued)

(58) Field of Classification Search
CPC ...... B23D 47/00; B23D 47/12; B23D 47/123; B23D 47/126; B23D 45/16; B23D 45/165; F16H 7/02
(Continued)

(56) References Cited

U.S. PATENT DOCUMENTS 2,455,840 A * 12/1948 Webb ........................ B27B 5/10
144/34.1
3,513,888 A * 5/1970 Welsh ................. B27B 17/0016
30/390
(Continued)

FOREIGN PATENT DOCUMENTS

CN 88206576 U 12/1988
CN 1097365 A 1/1995
(Continued)

OTHER PUBLICATIONS

English translation of International Preliminary Report on Patentability and Written Opinion of the international searching authority dated Nov. 29, 2016 in international patent application PCT/EP2015/001008 on which the claim of priority is based.

(Continued)

*Primary Examiner* — Jason Daniel Prone
*Assistant Examiner* — Richard D Crosby, Jr.
(74) *Attorney, Agent, or Firm* — Walter Ottesen, P.A.

(57) ABSTRACT

A handheld work apparatus has a drive motor which drives a work tool in rotation via a belt drive. The belt drive has at least one first, driving pulley and at least one second, driven pulley. Between the first pulley and the second pulley there acts at least one drive belt for transmitting the drive torque. A second pulley is connected to the tool for conjoint rotation. The rotational speed of the second pulley is less than the rotational speed of the first pulley during operation. The work apparatus has a brake unit which acts on the first pulley. The belt drive includes at least one redirection roll. During braking, at least one redirection roll bears on the tight side of each drive belt which acts between the first pulley and the second pulley. This allows a simple structure and safe braking of the work tool.

18 Claims, 7 Drawing Sheets

(51) Int. Cl.
*B27B 9/00* (2006.01)
*F16H 7/02* (2006.01)
*F16H 7/12* (2006.01)
*F16H 55/36* (2006.01)
*B23D 45/16* (2006.01)
*F16H 7/08* (2006.01)

(52) U.S. Cl.
CPC ............. *F16H 7/02* (2013.01); *F16H 7/1281* (2013.01); *F16H 55/36* (2013.01); *F16H 2007/0806* (2013.01); *F16H 2007/0865* (2013.01); *F16H 2007/0893* (2013.01)

(58) Field of Classification Search
USPC .................................................... 30/388–391
See application file for complete search history.

(56) References Cited

U.S. PATENT DOCUMENTS

| | | | | |
|---|---|---|---|---|
| 3,735,489 | A * | 5/1973 | Zatorsky, Jr. | B27B 17/0016 30/298.4 |
| 3,785,230 | A * | 1/1974 | Lokey | B23Q 11/0092 192/129 A |
| 4,006,528 | A * | 2/1977 | Katsuya | A01D 34/90 192/17 R |
| 4,402,138 | A * | 9/1983 | Glockle | F16P 7/02 200/61.45 M |
| 4,432,139 | A * | 2/1984 | Kohler | F16D 49/08 30/381 |
| 4,528,881 | A * | 7/1985 | Harris | B26D 7/0675 144/242.1 |
| 4,555,849 | A * | 12/1985 | Ando | B27B 9/00 30/388 |
| 4,574,531 | A * | 3/1986 | McCurry | B24B 23/06 451/297 |
| 4,683,660 | A | 8/1987 | Schurr | |
| 4,753,012 | A * | 6/1988 | Schurr | B27B 17/083 188/77 R |
| 4,847,513 | A * | 7/1989 | Katz | B23D 47/12 30/DIG. 1 |
| 5,058,470 | A | 10/1991 | Froehlich | |
| 5,690,391 | A * | 11/1997 | Kingsley | B23D 47/12 125/14 |
| 5,856,715 | A * | 1/1999 | Peot | B23D 45/16 30/388 |
| 6,039,037 | A * | 3/2000 | Taomo | B23D 47/12 125/13.01 |
| 6,233,831 | B1 * | 5/2001 | Iida | B23D 59/006 30/124 |
| 6,374,501 | B1 * | 4/2002 | Claesson | B23D 47/123 125/13.01 |
| 6,564,459 | B1 | 5/2003 | Steinbrueck et al. | |
| 7,059,228 | B2 * | 6/2006 | Chang | B23D 45/044 83/471.2 |
| 7,252,027 | B2 * | 8/2007 | Meredith | B23D 45/044 83/468.3 |
| 8,061,043 | B2 * | 11/2011 | Allen | B27B 9/02 30/388 |
| 8,418,590 | B2 * | 4/2013 | Agan | B23D 45/024 83/471.3 |
| 8,469,167 | B2 | 6/2013 | Hanussek et al. | |
| 8,939,857 | B2 * | 1/2015 | Doering | B23D 47/12 474/112 |
| 8,978,531 | B2 * | 3/2015 | Schaferling | B23D 45/046 83/303 |
| 8,998,684 | B2 | 4/2015 | Rosani et al. | |
| 9,073,232 | B2 | 7/2015 | Schell | |
| 9,353,721 | B2 | 5/2016 | Eberle et al. | |
| 9,713,881 | B2 | 7/2017 | Zimmermann et al. | |
| 10,371,044 | B2 | 8/2019 | Karrar | |
| 2007/0163409 | A1 | 7/2007 | Nishikawa et al. | |
| 2008/0276784 | A1 | 11/2008 | Zhang | |
| 2010/0237970 | A1 | 9/2010 | Liu | |
| 2010/0300256 | A1 * | 12/2010 | Loewe | B23Q 11/0082 83/72 |
| 2010/0300257 | A1 * | 12/2010 | Loewe | B23D 59/001 83/360 |
| 2011/0001102 | A1 * | 1/2011 | Hossler | B66D 5/10 254/322 |
| 2011/0113939 | A1 * | 5/2011 | Simon | B27G 19/02 83/13 |
| 2014/0215839 | A1 * | 8/2014 | Abe | B25F 5/001 30/388 |
| 2014/0251105 | A1 * | 9/2014 | Vinarcik | B23D 59/001 83/471 |
| 2015/0258658 | A1 * | 9/2015 | Steingruber | B24B 23/028 188/77 W |
| 2015/0258703 | A1 * | 9/2015 | Steingruber | B27B 17/083 188/77 W |
| 2017/0066068 | A1 * | 3/2017 | Hanussek | B23D 47/12 |
| 2017/0072482 | A1 | 3/2017 | Hanussek et al. | |
| 2017/0368618 | A1 | 12/2017 | Harris | |
| 2018/0179023 | A1 * | 6/2018 | Rebillard | B66B 11/008 |

FOREIGN PATENT DOCUMENTS

| | | | |
|---|---|---|---|
| CN | 1276282 A | 12/2000 | |
| CN | 201702452 U | 1/2011 | |
| CN | 201735891 U | 2/2011 | |
| CN | 102069422 A | 5/2011 | |
| CN | 202539686 U | 11/2012 | |
| CN | 103527686 A | 1/2014 | |
| CN | 104227791 A | 12/2014 | |
| CN | 104308261 A | 1/2015 | |
| DE | 4213617 A1 * | 10/1993 | ............ A01F 15/07 |
| EP | 0 042 918 A1 | 1/1982 | |
| GB | 191501284 A | 1/1916 | |
| JP | 2012196735 A | 10/2012 | |
| WO | 2015/180828 A1 | 12/2015 | |

OTHER PUBLICATIONS

English Translation and First Office Action of the Chinese Patent Office dated Jan. 17, 2018 in the corresponding Chinese patent application 201580026873.2.
International Search Report dated Jul. 20, 2015 of international application PCT/EP2015/001008 on which this application is based.
English translation of the first Office action and search report of Chinese State Intelletural Property Office dated Mar. 27, 2018 of corresponding Chinese patent application 201580026877.0.
English Translation and Office Action of the Chinese Patent Office dated Sep. 18, 2019 in the corresponding Chinese patent application 201810863674.2.

* cited by examiner

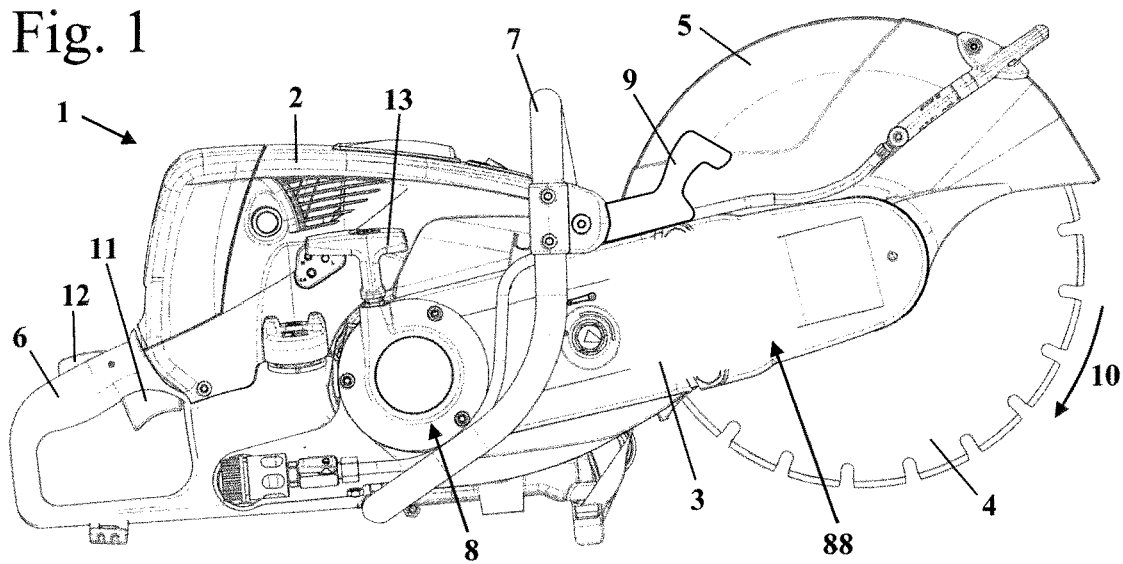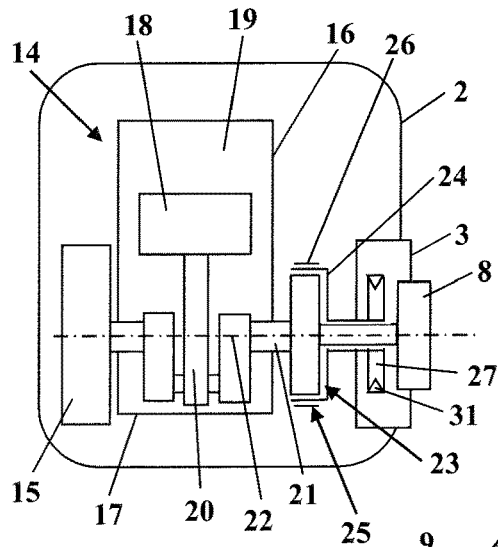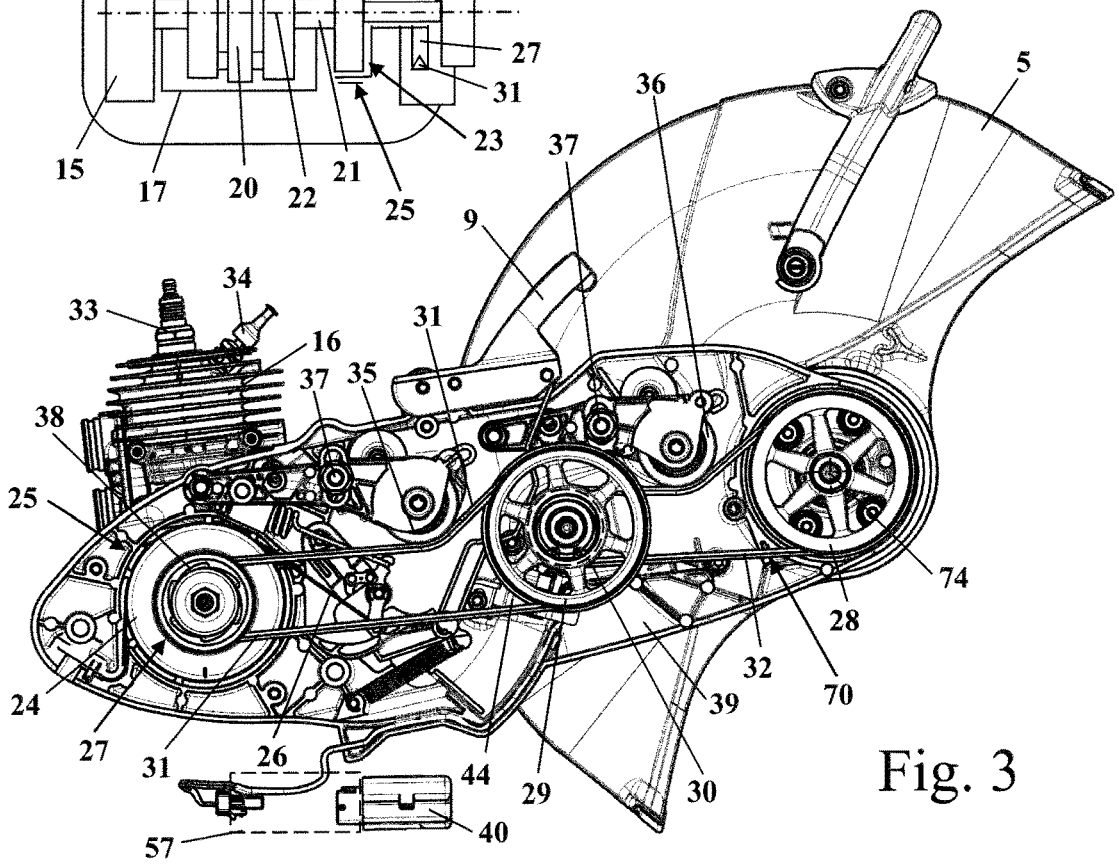

HANDHELD WORK APPARATUS

CROSS REFERENCE TO RELATED APPLICATIONS

This application is a continuation application of international patent application PCT/EP2015/001008, filed May 15, 2015, designating the United States and claiming priority from German application 10 2014 007 878.7, filed May 24, 2014, and the entire content of both applications is incorporated herein by reference.

BACKGROUND OF THE INVENTION

U.S. Pat. No. 6,039,037 discloses a cutting machine which is driven by a combustion engine and the work tool of which is driven via a belt drive. The diameter of the driving pulley is in this case smaller, for both belts of the belt drive, than the diameter of the driven pulley, and so the rotational speed of the work tool is less than the rotational speed of the combustion engine.

SUMMARY OF THE INVENTION

It is an object of the invention to provide a work apparatus which has a simple structure.

Provision is made for the work apparatus to have a brake unit. By way of the brake unit, a rapid standstill of the work tool can be achieved. In order to allow a compact structure, provision is made for the belt drive to include at least one redirection roll. In the event of braking, a redirection roll bears on the tight side of each drive belt, which acts between the first and the second pulley. The redirection roll ensures that the braking force can be transmitted via the tight side in the event of braking and prevents the tight side from lifting off the pulley. As a result, the brake unit can be arranged such that it acts on the driving, first pulley. The brake unit does not have to be arranged on the pulley to which the work tool is connected, but can be arranged away from the work tool. This results in a simple structure. The tight side in the event of braking is that side of each drive belt via which the braking force is transmitted from the first pulley to the second pulley during the braking operation.

Advantageously, the redirection roll is held in a fixed position during operation of the work apparatus. This ensures that the redirection roll cannot be pushed away during braking. Advantageously, the redirection roll is held in a fixed position via a releasable fixation arrangement. With the fixation arrangement released, the redirection roll is mounted advantageously in a pivotable and spring-loaded manner. Since the redirection roll is held in a fixed position during operation, the spring can be configured such that, with the fixation arrangement released, the desired belt tension arises. The drive belt can thus be tensioned easily by releasing and, after the spring force has acted on the redirection roll and has tensioned the belt, re-fixing the fixation arrangement. The belt tension is settable without taking the forces that prevail at the redirection roll during the braking operation into consideration, since the redirection roll is held in a fixed position in the event of braking.

Advantageously, each pulley of the belt drive is wrapped through a wrap angle of more than about 170° by a drive belt of the belt drive. In particular, each pulley of the belt drive is wrapped through a wrap angle of more than about 180° by a drive belt of the belt drive. This results in high transmissible forces in particular in the event of braking, such that the work tool can be braked. Advantageously, at least one pulley is wrapped through a wrap angle of more than 220° by a drive belt of the belt drive.

In order to achieve a comparatively large reduction in the rotational speed of the work tool with respect to the drive motor and thus to achieve comparatively low inertial forces acting on the work tool, the belt drive is advantageously constructed in an at least two-stage manner. The belt drive includes a first drive belt and a second drive belt, wherein the first drive belt is guided over the first pulley and a third pulley, wherein the third pulley is connected to a fourth pulley for conjoint rotation and wherein the second drive belt is guided over the fourth pulley. The diameter of the fourth pulley is in this case advantageously smaller than the diameter of the third pulley. The second drive belt is advantageously guided over the second pulley. This results in an at least two-stage belt drive. However, one or more further drive belts can also be provided. As a result of the at least two-stage configuration of the belt drive, a sufficiently large reduction in rotational speed can be achieved with an overall compact structure. The reduction in the rotational speed of the work tool brings about a reduction in the inertial forces on the work tool, thereby allowing the work tool to be braked by the belt drive. On account of the redirection roll, the wrap angle at each pulley can be kept comparatively large in spite of the different diameters of the pulleys. The at least one redirection roll in this case advantageously acts on the outer side of a drive belt and pushes the drive belt inwards in the direction of the other side of the belt, such that, on account of the redirection of the drive belt at the redirection roll, the wrap angles at the pulleys are increased. Preferably, the first pulley is driven directly by the drive motor during operation. Accordingly, no further drive belt is arranged between the drive motor and the first pulley. However, further elements, for example a clutch, can be arranged between the first pulley and the drive motor.

A simple structure of the brake unit arises when the brake unit includes a brake band which acts on a brake drum, wherein the brake drum is connected to the first pulley for conjoint rotation. In a particularly advantageous embodiment, the brake drum is the clutch drum of a centrifugal clutch of the work apparatus.

Advantageously, the brake unit has a brake position and a release position. The brake unit is advantageously held in the release position by a holding arrangement and is pretensioned in the direction of the brake position by a triggering spring. The pretensioning of the brake unit allows the brake unit to be triggered rapidly with low triggering forces. Advantageously, the work apparatus has an actuating element by which the brake unit is able to be adjusted from the brake position into the release position. The actuating element is advantageously intended to be actuated by the operator and can be for example an actuating lever or the like. During the adjustment of the brake unit from the brake position into the release position, the triggering spring of the brake unit is advantageously tensioned.

A simple structure arises when the holding arrangement includes an electromagnet. Not only does this ensure secure fixing of the brake unit in the release position, but the triggering of the brake unit can also take place electronically. Advantageously, the work apparatus has a control unit and a sensor, wherein the control unit causes the holding arrangement to be released if at least one triggering criterion determined by the sensor is present. The sensor is preferably a rotational speed sensor which determines the angular speed of a movement of the work apparatus about an axis parallel to the rotational axis of the work tool. A triggering criterion is advantageously the exceeding of a predetermined angular speed about this axis. If the work apparatus moves in an inadmissible manner, this movement can be sensed by the rotational speed sensor and the brake unit can be triggered. In addition to this triggering criterion, further triggering criteria can be used.

Advantageously, the brake unit is triggered depending on a rotational speed threshold, in particular if a rotational speed threshold is dropped below.

Advantageously, provision is made for the rotational speed of the second pulley to be at most 60% of the rotational speed of the first pulley. The work apparatus is preferably a cut-off machine and the work tool a cut-off disc. The rotational speed of the cut-off disc is in particular less than about 4000 revolutions per minute. Advantageously, the rotational speed of the cut-off disc is less than about 3000 revolutions per minute. This results in a comparatively low moment of inertia of the cut-off disc during operation, such that a sufficiently large braking force is transmissible to the cut-off disc via the belt drive.

BRIEF DESCRIPTION OF THE DRAWINGS

The invention will now be described with reference to the drawings wherein:

FIG. 1 is a side view of a cut-off machine;

FIG. 2 is a schematic sectional illustration of the cut-off machine from FIG. 1;

FIG. 3 is a side view of the cantilever of the cut-off machine from FIG. 1 with the cover removed and with the drive motor arranged thereon and the protective cover arranged thereon;

Figure 4:
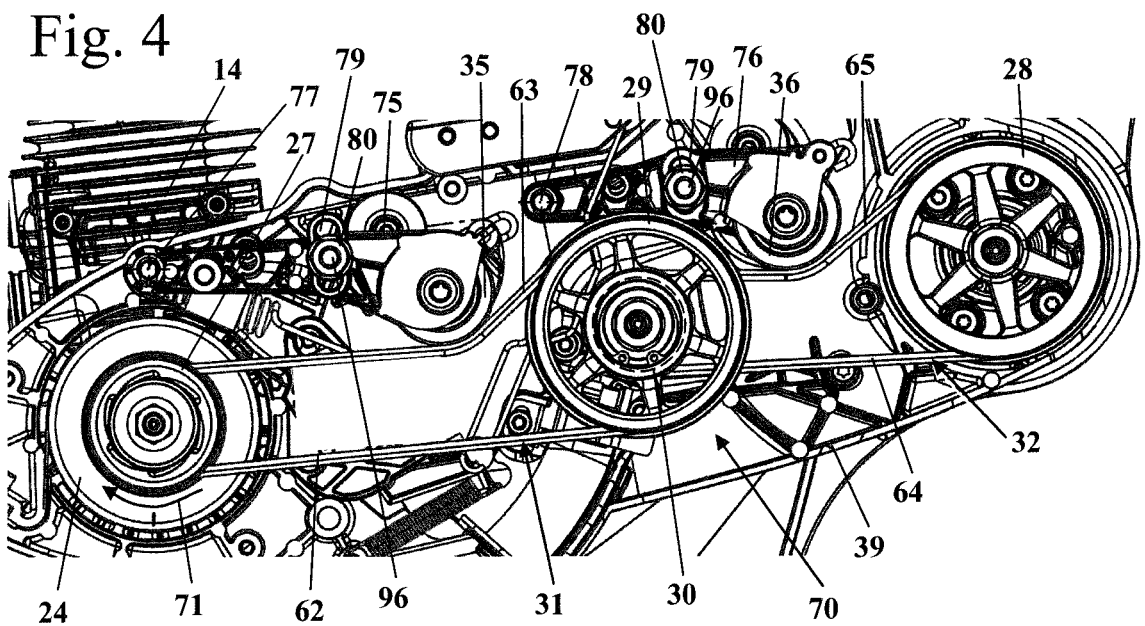
FIG. 4 and FIG. 5 show a detail from FIG. 3, which shows the belt drive.

DESCRIPTION OF THE PREFERRED
EMBODIMENTS OF THE INVENTION

FIG. 1 shows a cut-off machine 1 as an example of an embodiment of a handheld work apparatus. The cut-off machine 1 has a housing 2 to which a cantilever 3 is secured. At the free end of the cantilever 3, a work tool 4, specifically a cut-off disc, is mounted in a rotatable manner. During operation, the work tool 4 is driven in rotation in a rotational direction 10. The work tool 4 is covered around a part of its circumference by a protective cover 5 which is configured in one piece with a housing part 39 (FIG. 3) of the cantilever 3 in the embodiment. The protective cover 5 and the housing part 39 of the cantilever 3 can be made, for example, of metal and be produced by a casting process. The cantilever 3 includes a cover 88 which closes the housing part 39. Arranged on the cantilever 3 is an actuating element 9 which is configured as an actuating lever in the embodiment and serves to actuate a brake unit described in more detail in the following text.

Arranged on the housing 2 is a handle 6 which is configured as a rear handle in the embodiment and is arranged on that side of the housing 2 that faces away from the tool 4. The cantilever 3 projects forwards on that side of the housing 2 that faces away from the handle 6. A throttle lever 11 and a throttle lever lock 12 are mounted pivotably on the handle 6. Furthermore, a bale handle 7 is secured to the housing 2, the bale handle 7 engaging over the housing 2 on that side of the housing 2 that faces the work tool 4. The cut-off machine 1 has a starter arrangement 8 for a drive motor 14 (FIG. 2). A starter handle 13 which projects out of the housing 2 serves to actuate the starter arrangement 8.

FIG. 2 shows the structure of the drive of the cut-off machine 1 in more detail. The drive motor 14 is configured as a combustion engine and has a cylinder 16 in which a combustion chamber 19 is formed. The drive motor 14 is configured as a single-cylinder engine. The combustion chamber 19 is delimited by a piston 18 which drives a crankshaft 21, mounted in a crankcase 17 so as to rotate about a rotational axis 22, in rotation via a connecting rod 20. Secured to the crankshaft 21 is a flywheel 15 which can be configured as a fan wheel and serve to deliver cooling air. Arranged on that side of the drive motor 14 that faces away from the flywheel 15 is a centrifugal clutch 23. The centrifugal clutch 23 includes a clutch drum which serves as the brake drum 24 for a brake unit 25. Arranged on the outer circumference of the brake drum 24 is a brake band 26. A first pulley 27 of a belt drive 70 (FIG. 3) is connected to the brake drum 24 for conjoint rotation. A first drive belt 31 is held on the first pulley 27. The starter arrangement 8 is connected to the crankshaft 21 for conjoint rotation and is arranged on that side of the first pulley 27 that faces away from the centrifugal clutch 23. In the embodiment, the drive motor 14 is a two-stroke engine. The drive motor 14 can also be a four-stroke engine, however.

FIG. 3 shows the structure of the belt drive 70 in detail. The belt drive 70 includes the first pulley 27 and a second pulley 28. The second pulley 28 is connected to the work tool 4 for conjoint rotation and is mounted so as to be rotatable about a rotational axis 74. The rotational axis 74 is the rotational axis of the work tool 4. The first drive belt 31 is guided over the first pulley 27 and a third pulley 29. The first drive belt 31 forms a first drive stage with the first pulley 27 and the third pulley 29. A fourth pulley 30, shown schematically in FIG. 3, is connected to the third pulley 29 for conjoint rotation. A second drive belt 32 is guided over the fourth pulley 30 and the second pulley 28. The second drive belt 32 forms a second drive stage with the fourth pulley 30 and the second pulley 28. A first redirection roll 35 bears on the first drive belt 31. The position of the first redirection roll 35 is able to be fixed by a fixation arrangement 37. A redirection roll 36, the position of which is likewise able to be fixed by a fixation arrangement 37, bears on the second drive belt 32. As FIG. 3 also shows, an engagement contour 38 for the starter arrangement 8 is connected to the brake drum 24 for conjoint rotation. A spark plug 33 and a decompression valve 34 are arranged on the cylinder 16. As FIG. 3 also shows, the cut-off machine 1 has a rotational speed sensor 40 which is connected to a control unit 57. An electromagnet 44, which is described in more detail in the following text, is also connected to the control unit 57.

FIG. 4 shows the belt drive 70 during driving. The brake drum 24 is driven in the direction of the arrow 71 by the drive motor 14. The driving force is transmitted to the third pulley 29 via a tight side 62 of the first drive belt 31. The other side, illustrated at the top in FIG. 4, of the drive belt 31 is the loose side 63 during driving. The redirection roll 35 bears on the loose side 63 during driving. The second drive belt 32 has a tight side 64 by way of which the driving force is transmitted from the fourth pulley 30 to the second pulley 28. The other side, likewise illustrated at the top in FIG. 4, of the second drive belt 32 is the loose side 65, on which the redirection roll 36 bears.

As FIG. 4 shows, the first redirection roll 35 is mounted on the housing part 39 so as to be pivotable about a pivot axis 77 at a pivot lever 75. The pivot lever 75 has a groove 79 through which a bolt 96 projects, onto which a nut 80 is screwed. The nut 80 forms the fixation arrangement 37 (FIG. 3) with the bolt 96.

The second redirection roll 36 is mounted on a corresponding pivot lever 76, which is mounted on the housing part 39 so as to be pivotable about a pivot axis 78. The pivot lever 76 likewise has a groove 79 through which a bolt 96 projects, onto which a nut 80 is screwed, and forms the fixation arrangement 37 (FIG. 3) of the redirection roll 36 therewith.

Figure 5:
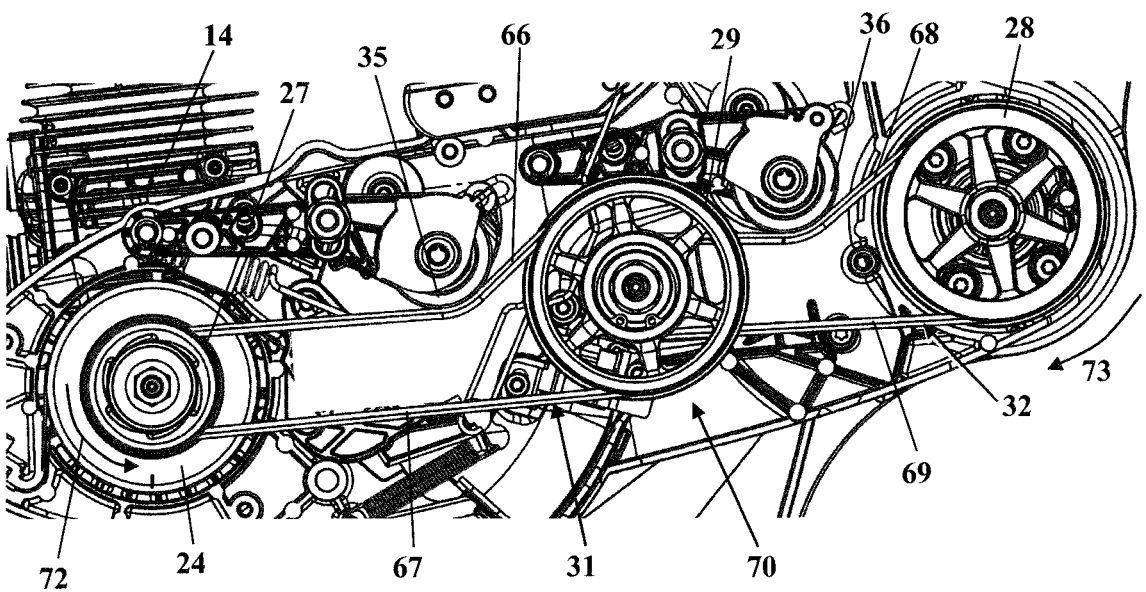

FIG. 5 shows the arrangement during braking. The braking force applied by the brake band 26 (FIG. 3) acts on the brake drum 24 in the direction of the arrow 72. The tight side 62 of the driving case is the loose side 67 during braking. The loose side 63 during driving is the tight side 66 during braking, on which the redirection roll 35 bears. In a corresponding manner, the tight side 64 of the second drive belt 32 is the loose side 69 during braking, and the loose side 65 during driving is the tight side 68 during braking. The redirection roll 36 bears on the tight side 68 during braking. The inertial force of the work tool 4 acts on the second pulley 28 in the direction of the arrow 73. The arrow 73 points in the rotational direction 10 of the work tool 4 (FIG. 1).

Figure 6:
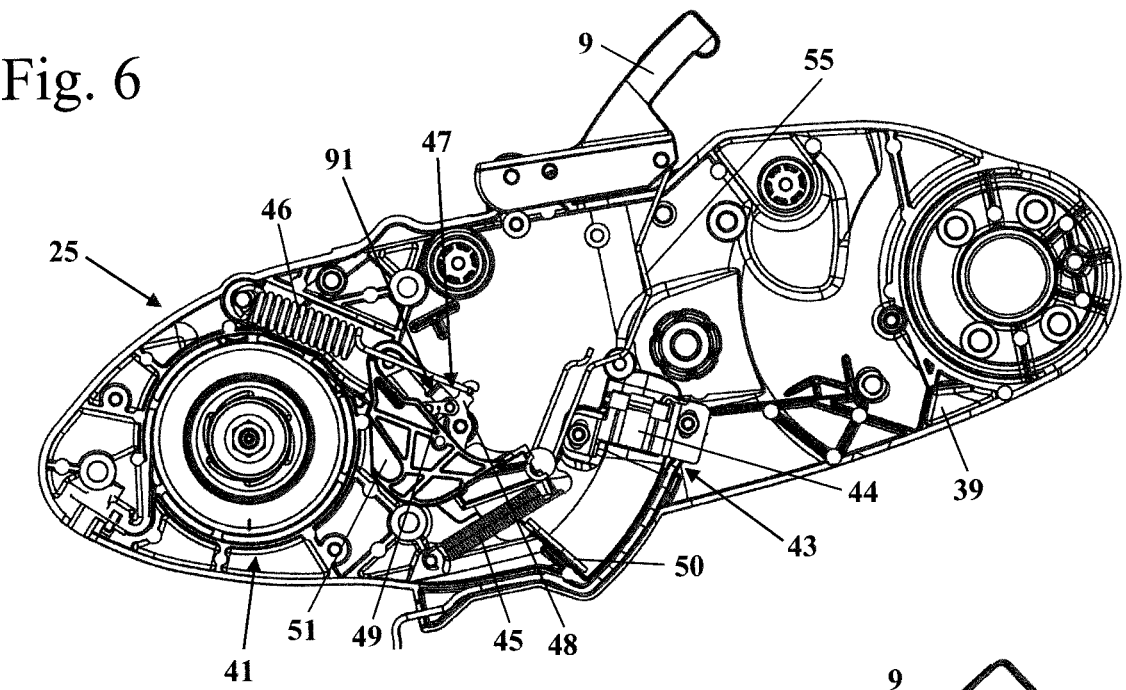
FIG. 6 is a side view of the brake unit at the cantilever in the brake position.
Figure 7:
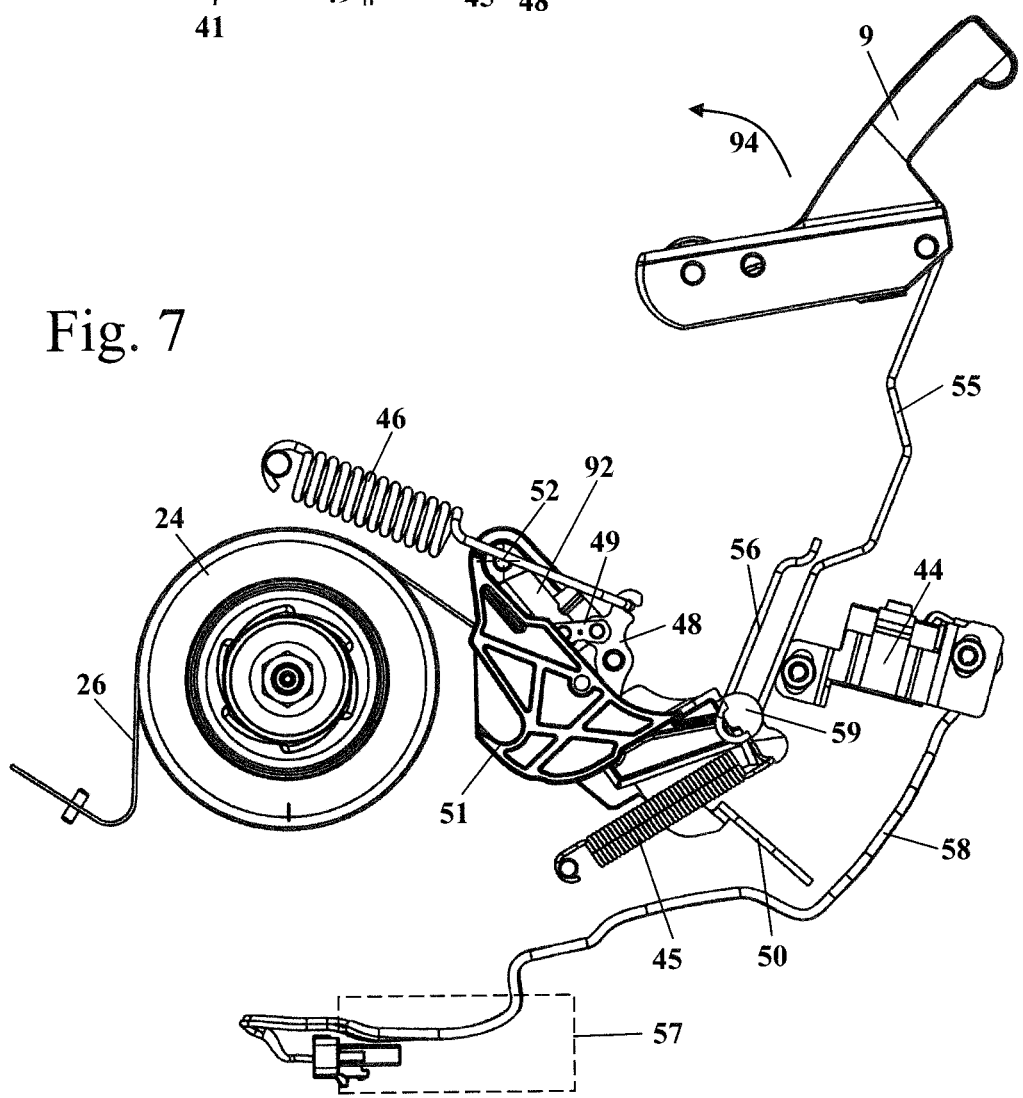
FIG. 7 is a side view of the brake unit in the brake position without the cantilever.
Figure 8:
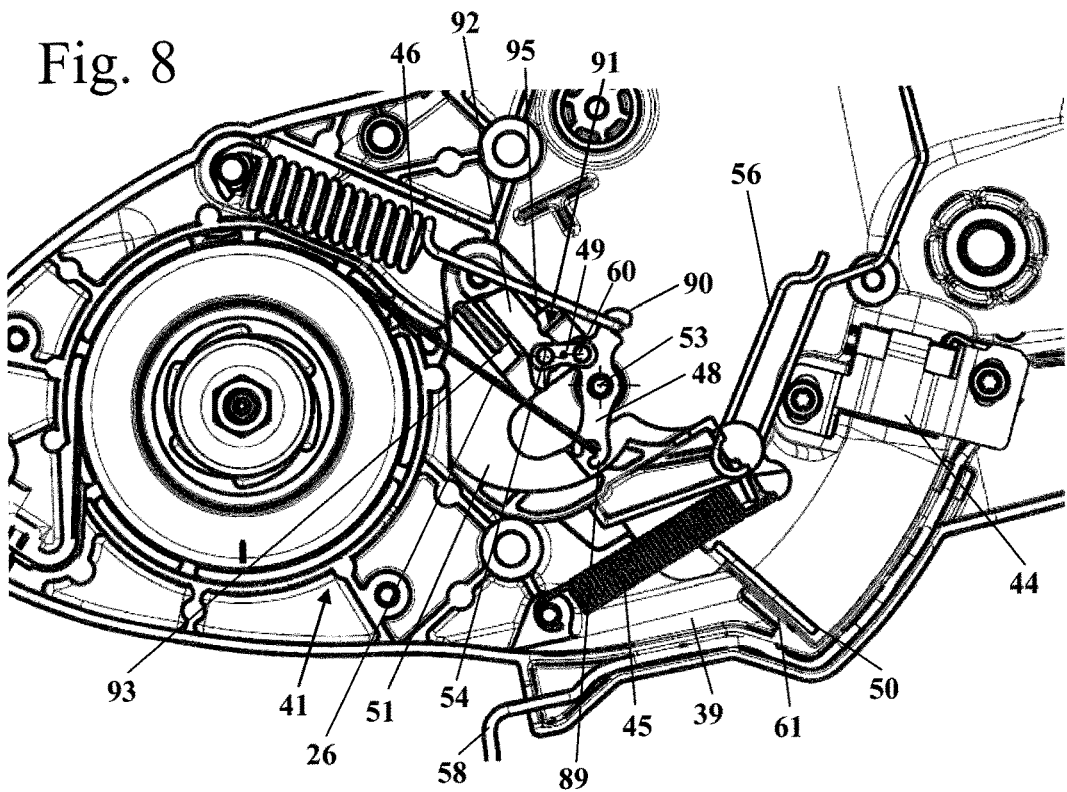
FIG. 8 shows a detail from FIG. 7 with the triggering lever in partial section.
Figure 9:
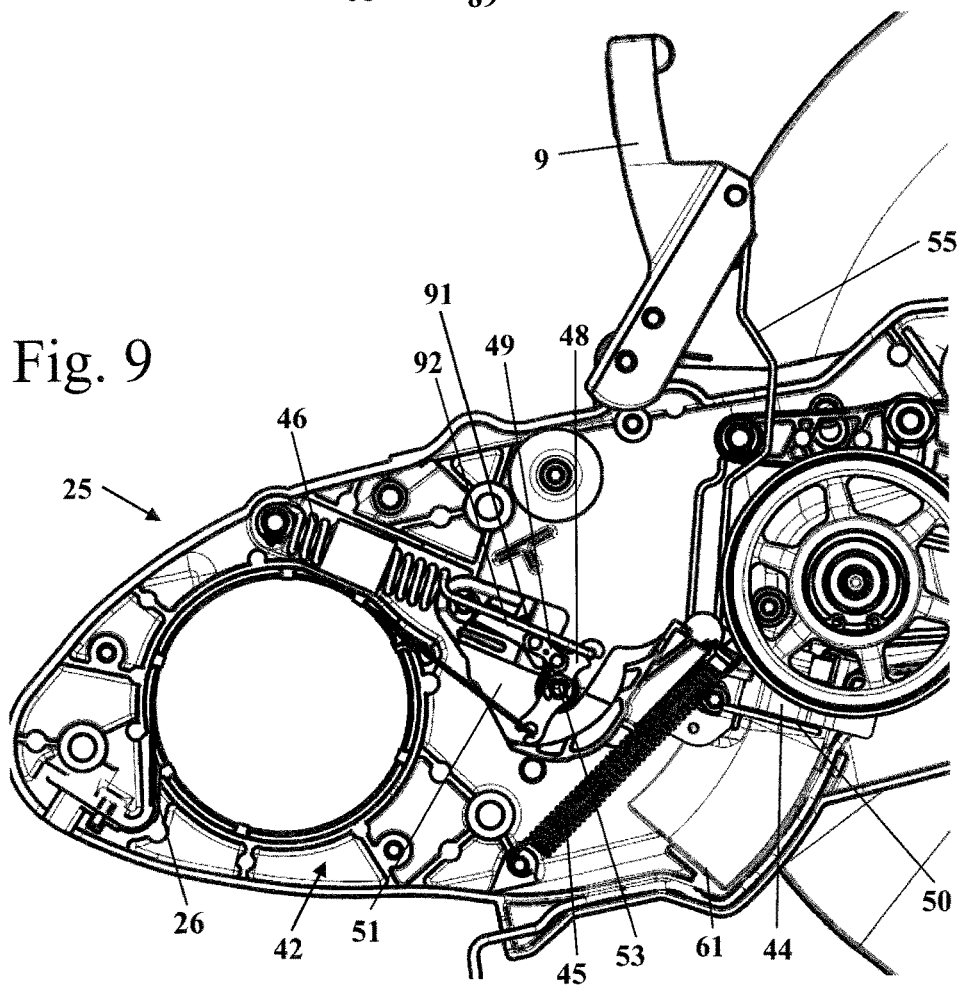
FIG. 9 shows the arrangement of FIG. 8 in the release position.

FIGS. 6 to 9 show the brake unit 25 in detail. In FIGS. 6 to 8, the brake unit 25 is shown in its brake position 41. In this position, the brake band 26 (FIG. 7) has been drawn tightly around the outer circumference of the brake drum 24 and as a result brakes the brake drum 24 and the belt drive 70. The brake unit 25 has a lever arrangement 47 which includes a lever 48, a triggering lever 51 and a toggle lever 91. The toggle lever 91 has a first articulated lever 49 and a second articulated lever 92. As FIG. 8 shows, the lever 48 is mounted on the first housing part 39 about a pivot axis 53. The brake band 26 is held on a first end 89 of the lever 48. A brake spring 46, which pretensions the brake unit 25 in the direction of the brake position 41, acts on a second end 90 of the lever 48. The triggering lever 51 is held on the housing part 39 (FIG. 6) so as to be pivotable about a pivot axis 52 shown in FIG. 7. As FIG. 8 shows, the first articulated lever 49 is mounted on the second articulated lever 92 so as to be pivotable about a pivot axis 54. The second articulated lever 92 is held on the triggering lever 51 with play and is pivotable slightly about the pivot axis 52 of the triggering lever 51 for tolerance compensation. The second articulated lever 92 is held in this case between the actuating contours 93 and 95 of the triggering lever 51. The second end of the first articulated lever 49 is secured to the lever 48 so as to be pivotable about a pivot axis 60. The triggering lever 51 is pretensioned in the direction of the brake position 41 via a triggering spring 45 shown in FIG. 8. The triggering lever 51 has a holding plate 50 which cooperates with an electromagnet 44 in the release position 42 of the brake unit 25. The electromagnet 44 forms with the holding plate 50 a holding arrangement 43 which holds the brake unit 25 in its release position 42 (FIG. 9). Furthermore, a coupling element 55, shown in FIG. 6, which is connected to the actuating element 9, acts on the triggering lever 51.

As FIG. 7 shows, the coupling element 55 includes a longitudinal guide 56. The triggering lever 51 is guided in the longitudinal guide 56 by a bearing element 59. If the actuating element 9 is pivoted out of the position shown in FIG. 7 into the position shown in FIG. 9 in the direction of the arrow 94, the coupling element 55 carries along the triggering lever 51 on the bearing element 59 and pivots the triggering lever 51 about the pivot axis 52 (FIG. 7). In the process, the triggering spring 45 and the brake spring 46 are tensioned. The holding plate 50 arrives at the electromagnet 44. The electromagnet 44 is energized during operation of the cut-off machine 1 and as a result holds the magnetic holding plate 50. As a result, the brake unit 25 is held in its release position 42 shown in FIG. 9. The energy for energizing the electromagnet 44 is generated during operation on account of the rotation of the crankshaft 21. If the rotational speed of the drive motor 14 and thus also of the crankshaft 21 drops below a rotational speed specified in the configuration, the energy of the electromagnet 44 is no longer sufficient to hold the holding plate 50. The triggering lever 51 is pivoted by the triggering spring 45 and the brake unit 25 is adjusted into its brake position 41. With the drive motor 14 at a standstill, the brake unit 25 is in its brake position 41 as a result. Provision can be made to provide further energy storage devices, which provide the electromagnet 44 with energy. As a result, the rotational speed, the dropping below of which causes the brake unit 25 to be adjusted into its brake position 41, can be shifted towards low rotational speeds. The additional energy storage devices can be for example rechargeable batteries, capacitors, a mechanical flywheel mass or the like.

As FIGS. 8 and 9 show, when pivoting from the brake position 41 (FIG. 8) into the release position 42 (FIG. 9), the triggering lever 51 pivots about the pivot axis 52. In the process, the triggering lever 51 carries along the second articulated lever 92 via the actuating contour 93. In the process, the dead center of the toggle lever 91 is passed. The brake spring 46 is tensioned during the pivoting of the lever 48, and the brake band 26 loosened.

In order to trigger the brake unit, the power supply to the electromagnet 44 is interrupted or the energy made available to the electromagnet 44 drops, on account of the reducing rotational speed, below a threshold specified in the configuration. As a result, the holding plate 50 is no longer held on the electromagnet 44. On account of the pretensioning of the triggering spring 45, the triggering lever 51 is pivoted. The triggering lever 51 carries along the second articulated lever 92 via the actuating contour 95 and as a result adjusts the toggle lever 91, via its dead center position, into a position in which the brake spring 46 acts on the lever 48. On account of the force of the brake spring 46, the lever 48 pivots and in the process tensions the brake band 26. As a result, the arrangement can be held in the release position 42 with little force, and only a small force on the triggering lever 51 is required to trigger the braking operation. The triggering spring 45 merely has to pivot the triggering lever 51 until the dead center of the toggle lever 91 has been passed. To this end, only a small force and a short spring travel are required. A leg spring can also be provided for example as the triggering spring 45. The braking force itself is applied by the pretensioned brake spring 46.

As FIGS. 8 and 9 also show, a stop 61 for the triggering lever 51 is formed on the housing part 39. The stop 61 is advantageously made of an elastic material and serves to cushion the holding plate 50 when the brake unit 25 is adjusted into the brake position 41. As an alternative, provision can also be made to provide a stop for the triggering lever 51. The stop made of elastic material can in this case be provided on the housing part 39 and/or on the triggering lever 51 or on the holding plate 50.

On account of the position of the actuating element 9 being decoupled from the position of the bearing element 59 via the longitudinal guide 56, the actuating element 9 can be pivoted back after being pivoted in the direction of the arrow 94 in FIG. 7, that is, after the brake unit 25 has been adjusted from the release position 42 into the brake position 41. The brake unit 25 is in this case held in the brake position 41 shown in FIG. 9 by the holding arrangement 43.

During operation of the cut-off machine 1, provision is made for the operator to adjust the brake unit into the release position 42 before starting to work with the cut-off machine. As FIG. 7 shows, the electromagnet 44 is connected to the control unit 57 via a connecting line 58, the control unit 57 also being connected, according to FIG. 3, to the rotational speed sensor 40. The rotational speed sensor 40 determines the angular speed of a movement of the work apparatus about an axis parallel to the rotational axis 74 of the work tool 4. As soon as a predetermined angular speed about this axis has been exceeded and this has been detected by the control unit 57 on account of the values supplied by the rotational speed sensor 40, the control unit 57 triggers the brake unit 25 by interrupting the power supply to the electromagnet 44. This causes the holding arrangement 43 to be released. The triggering spring 45 and the brake spring 46 adjust the brake unit 25 into the brake position 41 with the holding arrangement 43 released, and brake the brake drum 24. Via the drive belts 31 and 32, the work tool 4 is braked. If the rotational speed of the drive motor 14 drops below a rotational speed threshold specified in the configuration, the energy of the electromagnet 44 is no longer sufficient to hold the brake unit 25 in the release position 52, and the brake unit 25 is adjusted into its brake position 41.

Figure 10:
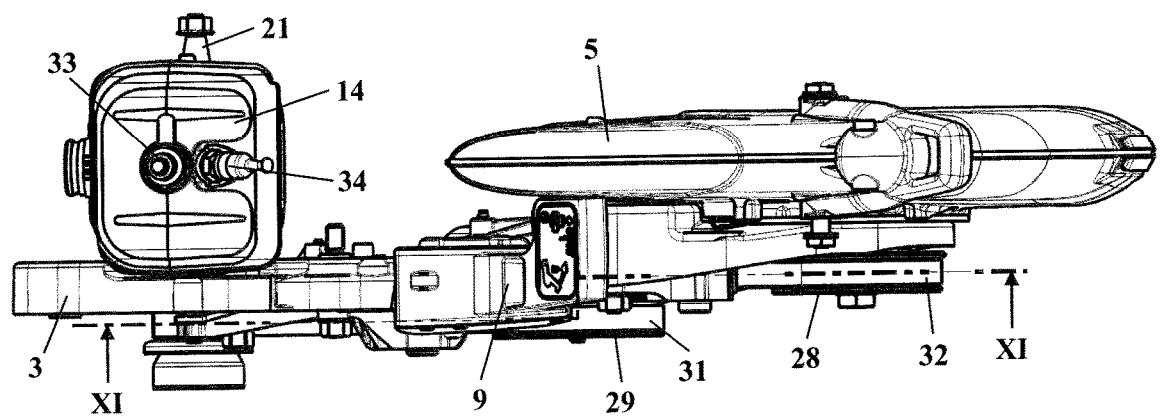
FIG. 10 is a plan view of the arrangement from FIG. 3.
Figure 11:
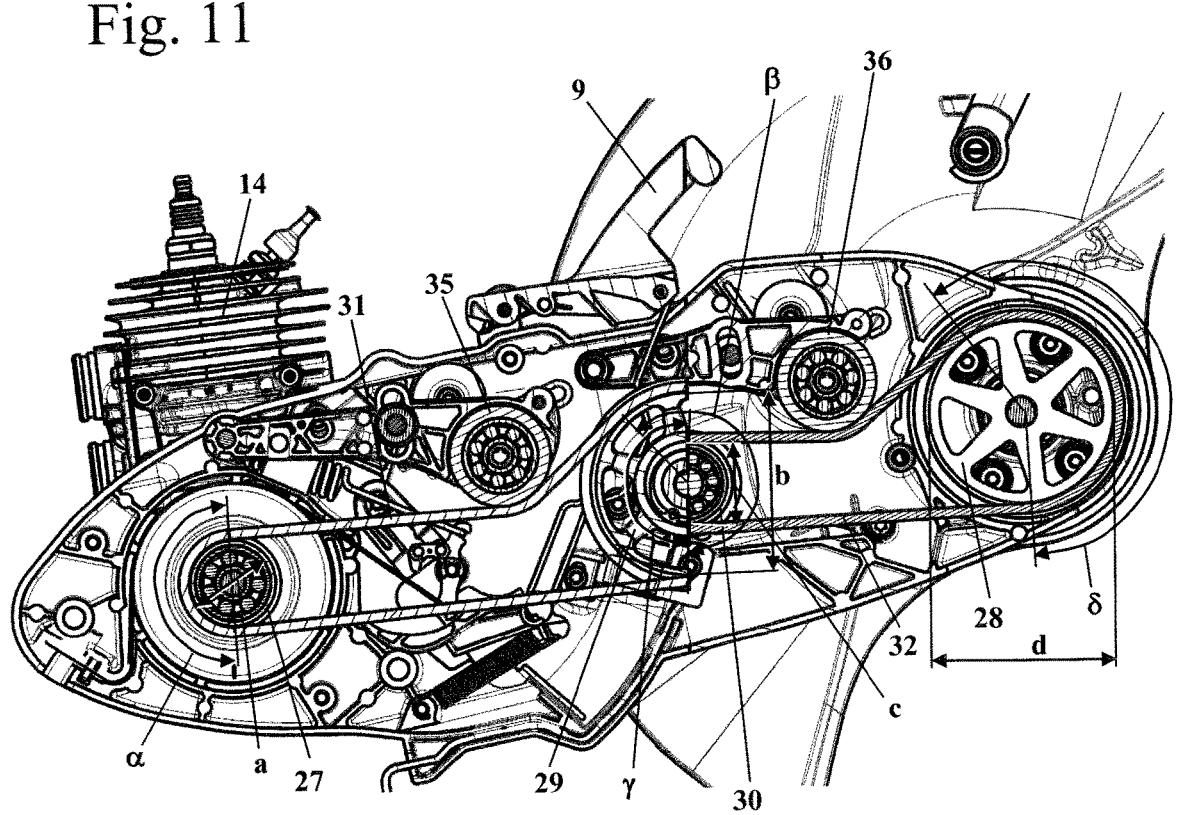
FIG. 11 shows a section along the line XI-XI in FIG. 10.
Figure 12:
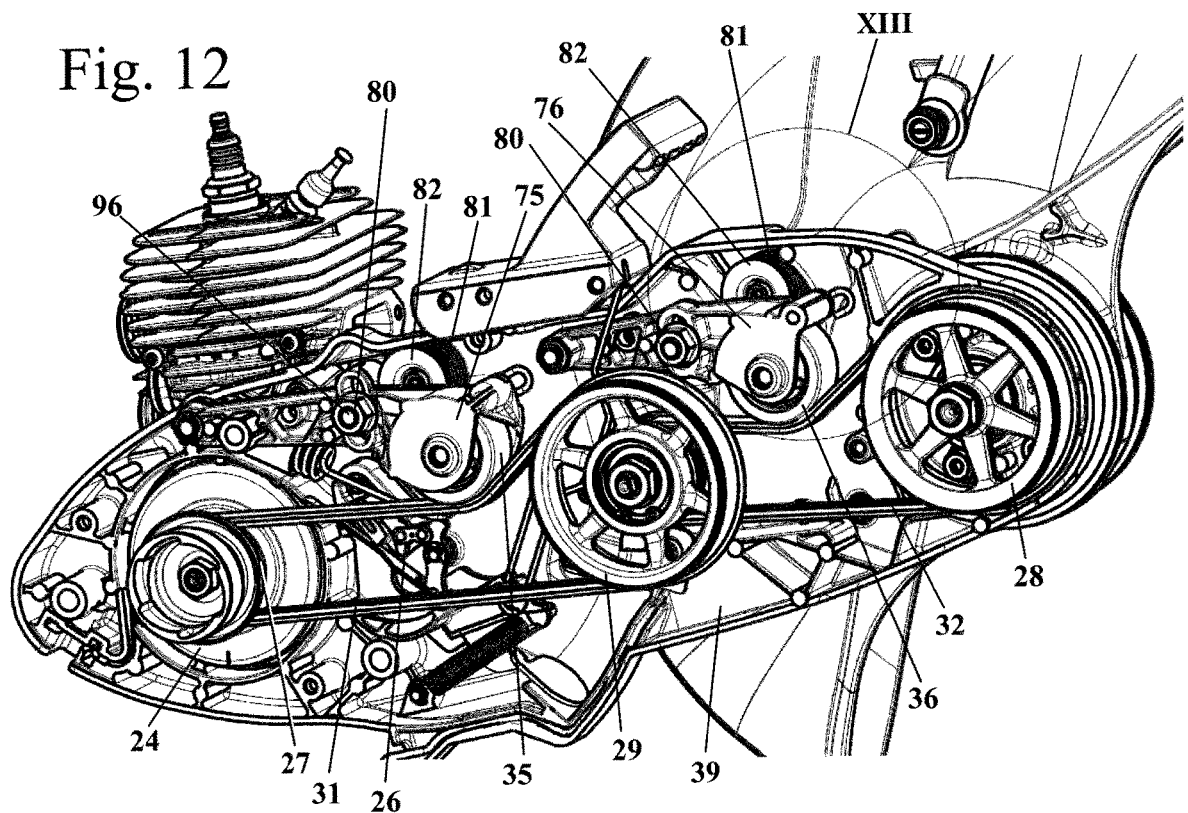
FIG. 12 is a perspective illustration of the arrangement from FIG. 3.

The sectional illustration in FIG. 11, which shows the section, shown in FIG. 10, through the belt drive 70, shows the diameter and wrap angle at the pulleys 27 to 30. The first pulley 27 has a diameter (a) and is wrapped by the first drive belt 31 through a wrap angle α which is advantageously at least about 170°, in particular more than about 180°. In the embodiment, the wrap angle α is approximately 180°. The third pulley 29 has a diameter (b) which is much greater than the diameter (a) of the first pulley 27. The third pulley 29 is wrapped by the first drive belt 31 through a wrap angle β which is advantageously more than about 170°, in particular more than about 180°. Preferably, the wrap angle β is at least about 220°.

The fourth pulley 30 has a diameter (c) which is much smaller than the diameter (b) of the third pulley 29. The diameter (b) can be for example twice, preferably at least 2.5 times the diameter (c). The fourth pulley 30 is wrapped by the second drive belt 32 through a wrap angle γ which is advantageously at least about 170°, in particular at least about 180°.

The second pulley 28 has a diameter (d) which can preferably correspond approximately to the diameter (b) of the third pulley 29. The diameter (d) is much greater than the diameter (c) of the fourth pulley 30. The diameter (d) can be for example at least twice, preferably at least 2.5 times the diameter (c). The second pulley 28 is wrapped by the second drive belt 32 through a wrap angle δ which is advantageously more than about 180°, in particular at least about 220°. The comparatively large wrap angles γ and δ are achieved on account of the redirection rolls 35 and 36. On account of the different diameters of the pulleys 27 to 30, the rotational speed of the second pulley 28 is much less than the rotational speed of the first pulley 27. Advantageously, the rotational speed of the second pulley 28 is at most about 60% of the rotational speed of the first pulley 27. The rotational speed of the work tool 4, namely of the cut-off disc of the cut-off machine 1, is advantageously less than about 4000 revolutions per minute, preferably less than about 3000 revolutions per minute. On account of the lower rotational speed of the second pulley 28, the torque transmitted to the second pulley 29 is much greater than the torque transmitted by the first pulley 27 to the first drive belt 31. In particular, a redirection roll 36 on the drive belt 32 is advantageous at the second drive stage.

Figure 13:
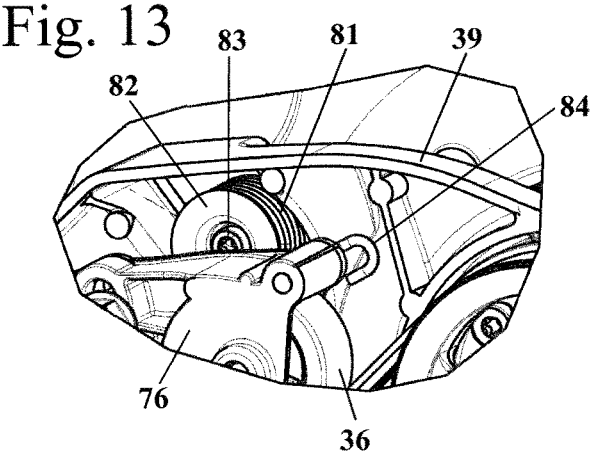
FIG. 13 shows the detail XIII from FIG. 12 in an enlarged illustration.
Figure 14:
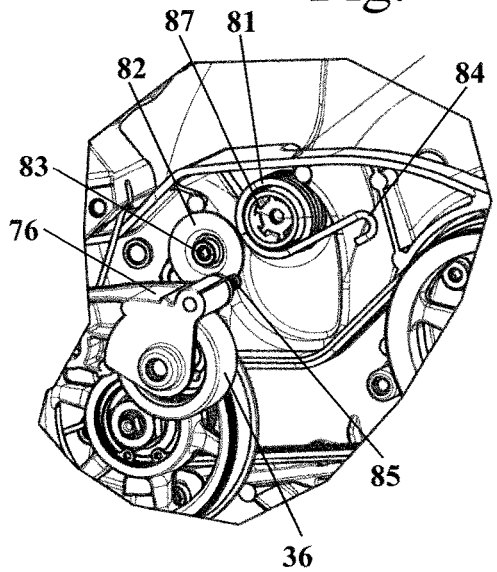
FIG. 14 shows the arrangement from FIG. 13 in an exploded illustration.
Figure 15:
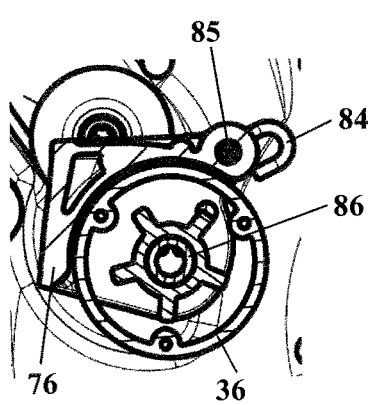
FIG. 15 shows a section through the redirection roll from FIG. 13.

FIGS. 12 to 15 show the configuration and mounting of the redirection rolls 35 and 36 in detail. The two pivot levers 75 and 76 are advantageously of identical configuration. Mounted on the housing part 39 next to each redirection roll 35, 36 is a spring 81, which is configured as a torsion spring in the embodiment. The spring 81 is covered by a retaining plate 82 on its end side and axially fixed thereby. As FIG. 13 shows, the retaining plate 82 is fixed to the housing part 39 by an attachment screw 83. The spring 81 has an end 84 which acts on the pivot lever 76. As FIG. 14 shows, a lug 85 is held on the pivot lever 76, the end 84 of the spring 81 acting on the lug 85. The spring 81 is held on a bearing support 87 of the housing part 39. As FIG. 15 shows, the redirection roll 36 is mounted on the pivot lever 76 so as to be rotatable at a bearing pin 86. The second end of the spring 81 is supported on the housing part 39. The mounting of the redirection roll 35 on the pivot lever 75 is configured in a corresponding manner to the mounting of the redirection roll 36.

In order to tension the drive belts 31 and 32, the nuts 80 on the pivot levers 75 and 76 are loosened. As a result, in each case one spring 81 acts, via a lug 85, on the pivot lever 75 and the pivot lever 76, which is pushed against the drive belt 31 and 32 with the predetermined force as a result. Subsequently, the nuts 80 are fixed such that the pivot levers 75 and 76 are held in a fixed position on the housing part 39. During the braking operation, the redirection rolls 35 and 36 bear on the tight side 66 and 68, respectively, of the drive belts 31, 32. Since the redirection rolls are held in a fixed position on the housing part 39, sufficiently large forces can be transmitted to the work tool 4 via the belt drive 70.

In the embodiment, the brake unit 25 acts on the first pulley 27. However, provision can also be made for the brake unit 25 to act on the fourth pulley 30. The fourth pulley 30, too, is a driving pulley. The arrangement of a brake unit 25 on the fourth pulley 30 results in a simple structure since the brake unit 25 does not have to be arranged on the driven pulley 28, that is, does not have to be arranged in the immediate spatial vicinity of the work tool 4.

Figure 17:
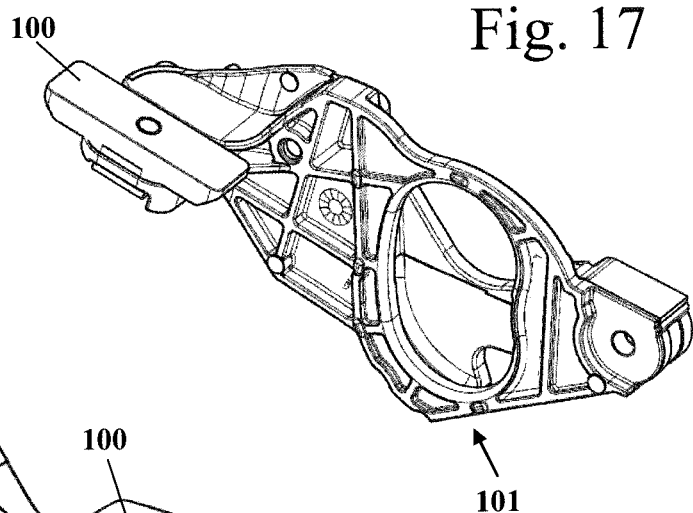
FIGS. 16 and 17 are perspective illustrations of an embodiment of a triggering lever of a cut-off machine.
Figure 16:
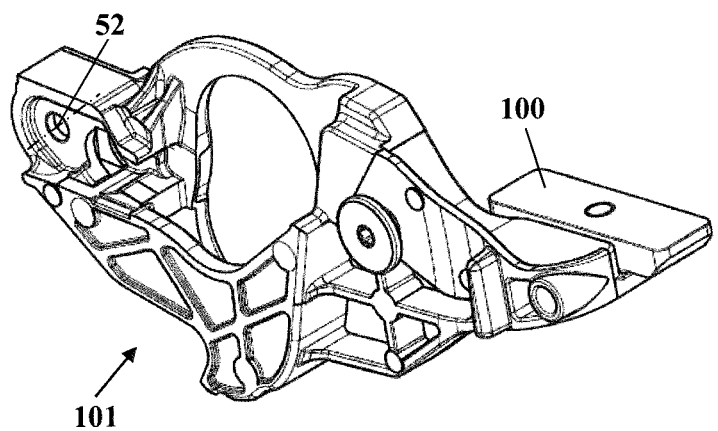
Figure 18:
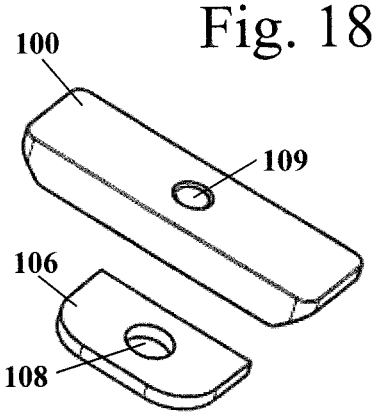
FIG. 18 is an exploded illustration of the triggering lever in the region of the holding plate; and, FIG. 19 is a sectional illustration through the region of the holding plate of the triggering lever.

FIGS. 16 to 18 show an embodiment of a triggering lever 101 for the brake unit 25. The structure of the triggering lever 101 corresponds substantially to that of the triggering lever 51. The triggering lever 101 is mounted so as to be pivotable about a pivot axis 52. Secured to the triggering lever 101 is a holding plate 100 which, in order to compensate for tolerances, is movable slightly, in particular tiltable, with respect to the triggering lever 101. As a result, it is possible to ensure that the holding plate 100 can bear flat on the electromagnet 44, thereby ensuring a sufficiently high holding force.

Figure 19:
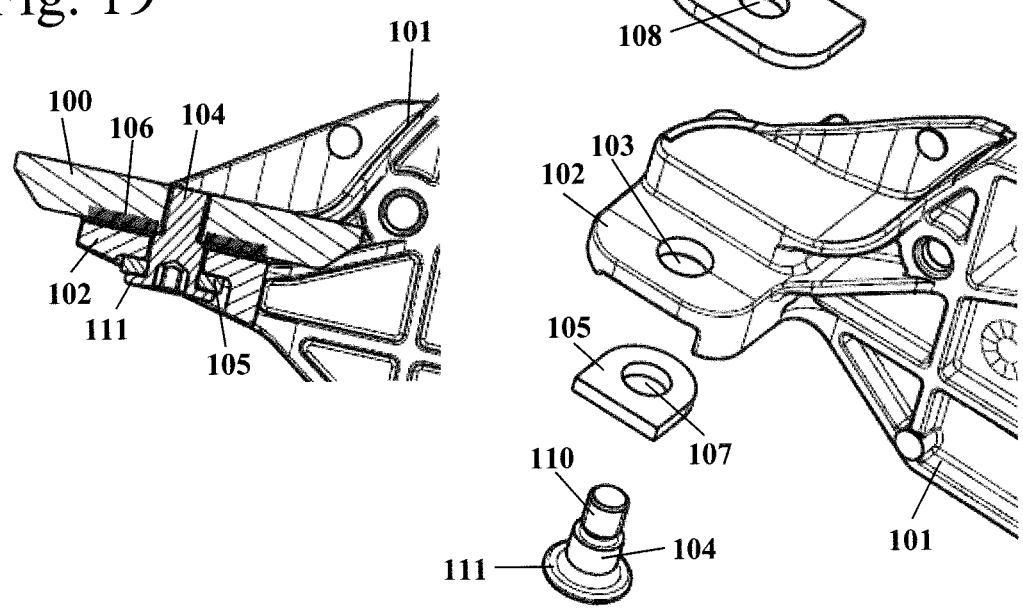

FIGS. 18 and 19 show the movable mounting of the holding plate 100 in detail. As FIG. 18 shows, the triggering lever 101 has an attachment region 102 to which the holding plate 100 is fixed. Through the attachment region 102 there extends an attachment opening 103, through which a threaded fastener 104 projects. The threaded fastener 104 is screwed into the holding plate 100 in the embodiment. To this end, the threaded fastener 104 has a thread section 110 which is screwed into an attachment opening 109, provided with an internal thread, of the holding plate 100. Arranged between the head 111 of the threaded fastener 104 and the attachment region 102 is a damping element 105. The damping element 105 has an attachment opening 107 through which the threaded fastener 104 projects. Arranged between the attachment region 102 and the holding plate 100 is a further damping element 106 which has an attachment opening 108 through which the threaded fastener 104 projects. The damping elements 105 and 106 are made of an elastic material and are configured as flat plates in the embodiment.

FIG. 19 shows the structure in the assembled state. The damping element 105 is arranged between the head 111 of the threaded fastener 104 and the attachment region 102 and the holding plate 100 is arranged on the opposite side of the attachment region 102. The damping element 106 is arranged between the attachment region 102 and holding plate 100 and projects into a depression in the holding plate 100 in the embodiment. The arrangement is made here such that the holding plate 100 is slightly movable with respect to the attachment region 102 of the triggering lever 101, in particular tiltable about its longitudinal axis and about its transverse axis. As a result, tolerances between the holding plate 100 and the electromagnet 44 can be compensated and the holding plate 100 can bear flat on the electromagnet 44.

Other configurations for compensating for tolerances between the holding plate (50, 100) and electromagnet 44 can also be expedient.

It is understood that the foregoing description is that of the preferred embodiments of the invention and that various changes and modifications may be made thereto without departing from the spirit and scope of the invention as defined in the appended claims.

What is claimed is:

1. A handheld work apparatus comprising:
   a work tool;
   a belt drive;
   a drive motor configured to drive said work tool via said belt drive;
   said belt drive having a first pulley configured as a driving pulley and a second pulley configured as a driven pulley;
   said belt drive further having a belt driven by said driving pulley and being configured to act between said first pulley and said second pulley so as to transfer a drive moment from said first pulley to said second pulley;
   said second pulley being connected to said work tool in a rotationally fixed manner;
   said first pulley being configured to rotate at a first rotational speed during operation;
   said second pulley being configured to rotate at a second rotational speed during operation;
   said second rotational speed being less than said first rotational speed;
   a brake unit configured to act on said first pulley;
   said belt drive having a redirection roll;
   said belt having mutually opposite lying first and second sides extending between said first and second pulleys;
   said first side of said belt being under tension to form a tight side of said belt during driving by said first pulley and said second side of said belt being under tension to form a tight side of said belt during braking by said brake unit acting on said first pulley; and,
   said redirection roll being configured to contact said second side of said belt.

2. The handheld work apparatus of claim 1, wherein said redirection roll is held in a positionally fixed manner during operation.

3. The handheld work apparatus of claim 1 further comprising:
   a releasable fixation arrangement configured to hold said redirection roll in a positionally fixed manner during operation; and,
   said redirection roll being mounted in a pivotable and spring-loaded manner when said releasable fixation arrangement is in a released state.

4. The handheld work apparatus of claim 1, wherein each of said first pulley and said second pulley are configured to be wrapped by said belt with a wrap angle of at least 170°.

5. The handheld work apparatus of claim 1, wherein:
   said belt is a first belt;
   said belt drive further has a second belt, a third pulley configured as a driven pulley and a fourth pulley configured as a driving pulley;
   said first belt is guided over said first pulley and said third pulley;
   said third pulley is connected to said fourth pulley in a rotationally fixed manner; and,
   said second belt is guided over said fourth pulley.

6. The handheld work apparatus of claim 5, wherein:
   said fourth pulley has a diameter (c);
   said third pulley has a diameter (b); and,
   said diameter (c) is smaller than said diameter (b).

7. The handheld work apparatus of claim 5, wherein said second belt is guided over said second pulley.

8. The handheld work apparatus of claim 5, wherein said first pulley is configured to be driven by said drive motor during operation.

9. The handheld work apparatus of claim 1, wherein:
   said brake unit includes a brake drum and a brake band configured to act on said brake drum; and,
   said brake drum is connected to said first pulley in a rotationally fixed manner.

10. The handheld work apparatus of claim 1 further comprising:
    a holding arrangement;
    said brake unit having a braking position and a released position;
    said holding arrangement being configured to hold said brake unit in said released position; and,
    a triggering spring configured to pretension said brake unit in the direction of said braking position.

11. The handheld work apparatus of claim 10 further comprising:
an actuating element; and,
said brake unit being configured to be adjustable out of said braking position into said released position via said actuating element.

12. The handheld work apparatus of claim 10, wherein said holding arrangement includes an electromagnet.

13. The handheld work apparatus of claim 1, wherein said second pulley is configured to rotate at a rotational speed of at most 60% of a rotational speed of said first pulley.

14. The handheld work apparatus of claim 1, wherein the handheld work apparatus is a cut-off machine and said work tool is a cutting disc.

15. The handheld work apparatus of claim 14, wherein said cutting disc is configured to rotate at less than 4000 revolutions per minute.

16. A handheld work apparatus comprising:
a work tool;
a belt drive;
a drive motor configured to drive said work tool via said belt drive;
said belt drive having a first pulley configured as a driving pulley and a second pulley configured as a driven pulley;
said belt drive further having a belt driven by said driving pulley and being configured to act between said first pulley and said second pulley so as to transfer a drive moment from said first pulley to said second pulley;
said second pulley being connected to said work tool in a rotationally fixed manner;
said first pulley being configured to rotate at a first rotational speed during operation;
said second pulley being configured to rotate at a second rotational speed during operation;
said second rotational speed being less than said first rotational speed;
a brake unit configured to act on said first pulley;
said belt drive having a redirection roll;
said belt having mutually opposite lying first and second sides extending between said first and second pulleys;
said first side of said belt being under tension to form a tight side of said belt during driving by said first pulley and said second side of said belt being under tension to form a tight side of said belt during braking by said brake unit acting on said first pulley;
said redirection roll being configured to contact said second side of said belt; and,
wherein said first pulley is configured to be wrapped by said belt with a wrap angle of at least 170° and said second pulley is configured to be wrapped by said belt with a wrap angle of at least 220°.

17. A handheld work apparatus comprising:
a work tool;
a belt drive;
a drive motor configured to drive said work tool via said belt drive;
said belt drive having a first pulley configured as a driving pulley and a second pulley configured as a driven pulley;
said belt drive further having a belt driven by said driving pulley and being configured to act between said first pulley and said second pulley so as to transfer a drive moment;
said second pulley being connected to said work tool in a rotationally fixed manner from said first pulley to said second pulley;
said first pulley being configured to rotate at a first rotational speed during operation;
said second pulley being configured to rotate at a second rotational speed during operation;
said second rotational speed being less than said first rotational speed;
a brake unit configured to act on said first pulley;
said belt drive having a redirection roll;
said belt having mutually opposite lying first and second sides extending between said first and second pulleys;
said first side of said belt being under tension to form a tight side of said belt during driving by said first pulley and said second side of said belt being under tension to form a tight side of said belt during braking by said brake unit acting on said first pulley;
said redirection roll being configured to contact said second side of said belt;
a holding arrangement;
said brake unit having a braking position and a released position;
said holding arrangement being configured to hold said brake unit in said released position, wherein said holding arrangement includes an electromagnet;
a triggering spring configured to pretension said braking unit in the direction of said braking position;
a control unit;
a sensor configured to determine a triggering criterium; and,
said control unit being configured to effect a releasing of said holding arrangement when said triggering criterium is determined.

18. The handheld work apparatus of claim 17, wherein:
said work tool defines a work tool rotational axis;
said sensor is a rotational speed sensor configured to determine an angular speed of a movement of the handheld work apparatus about an axis parallel to said work tool rotational axis; and,
said control unit is configured to determine a triggering criterium when said angular speed exceeds a predetermined angular speed.

* * * * *